United States Patent
England

(10) Patent No.: US 10,678,496 B2
(45) Date of Patent: Jun. 9, 2020

(54) AUDIO TRANSMITTER AND RECEIVER

(71) Applicant: Stéphanie England, Gatineau (CA)

(72) Inventor: Stéphanie England, Gatineau (CA)

( * ) Notice: Subject to any disclaimer, the term of this patent is extended or adjusted under 35 U.S.C. 154(b) by 0 days.

(21) Appl. No.: 15/429,140

(22) Filed: Feb. 9, 2017

(65) Prior Publication Data

US 2017/0235543 A1  Aug. 17, 2017

Related U.S. Application Data

(60) Provisional application No. 62/293,778, filed on Feb. 11, 2016.

(30) Foreign Application Priority Data

Mar. 22, 2016  (CA) ...................................... 2924443

(51) Int. Cl.
*G06F 3/16* (2006.01)
*G10L 19/00* (2013.01)
*G10L 19/16* (2013.01)

(52) U.S. Cl.
CPC .............. *G06F 3/165* (2013.01); *G06F 3/167* (2013.01); *G10L 19/0017* (2013.01); *G10L 19/173* (2013.01)

(58) Field of Classification Search
CPC ... G10L 19/0017; G10L 19/173; G06F 3/167; G06F 3/165
See application file for complete search history.

(56) References Cited

U.S. PATENT DOCUMENTS

| | | | |
|---|---|---|---|
| 2002/0086716 A1* | 7/2002 | Pan | H04M 1/6083 455/569.2 |
| 2007/0174412 A1* | 7/2007 | Araki | G11B 19/02 709/213 |
| 2011/0017620 A1* | 1/2011 | Latchford | A45C 11/00 206/320 |
| 2011/0103609 A1* | 5/2011 | Pelland | H04R 1/1041 381/74 |
| 2014/0016796 A1* | 1/2014 | Maust | H04R 1/1041 381/74 |
| 2014/0064492 A1* | 3/2014 | Lakkundi | H04R 3/14 381/17 |

(Continued)

OTHER PUBLICATIONS

Gogroove, BlueGATE Audio transmitter receiver—kit with 3.5mm cable—available on internet to public Jul. 2015 Internet Archive capture, 1 page. (Year: 2015).*

(Continued)

*Primary Examiner* — Fan S Tsang
*Assistant Examiner* — David Siegel
(74) *Attorney, Agent, or Firm* — PatentAgency.ca; Luis P. Estable

(57) ABSTRACT

Disclosed herein is an audio transmitter receiver device. The device includes an audio interface providing an audio signal, the audio signal including at least one of an audio input signal and an audio output signal; a digital communications interface for at least communicating audio information; and an audio codec for transcoding the audio information such that the audio information includes at least a high quality distortion free lossless representation of the audio signal and the audio signal includes an audio representation of the audio information.

1 Claim, 19 Drawing Sheets

(56) References Cited

U.S. PATENT DOCUMENTS

2015/0139440 A1* 5/2015 Crawford .............. H04R 27/00
381/77

OTHER PUBLICATIONS

Sonicelectronix, Bluetooth audio adapter—waterproof—available on internet to public Dec. 2015 Internet Archive capture, two pages (Year: 2015).*
Sonicelectronix, Bluetooth audio adapter—available on internet to public Dec. 2015 Internet Archive capture, two pages (Year: 2015) (Year: 2015).*
Staples, Google Chromecast Audio, http://www.staples.ca/en/Google-Chromecast-Audio/product_1917545_2-CA_1_20001.
Google, Supported Media for Google Cast, https://developers.google.com/cast/docs/media.

* cited by examiner

Music

Play – Pause – Resume:

Go to next song - FFWD:

Go to previous song - RWD:

Volume

Volume up:

Volume down:

Slide On or Off:

RX or TX:

1: 32 LED INDICATOR
(red – yellow – green)
2: 22 +
3: 24 -
4: 26 Previous
5: 28 Next
6: 21 Play/Pause
7: 16 ON/off switch
8: 36 Mic
9: 18 RX/TX/Synchrone switch
10: 30 Micro USB
11: 34 Audio 3.5 mm
12: 14 Key holder

US 10,678,496 B2

AUDIO TRANSMITTER AND RECEIVER

CROSS-REFERENCE TO RELATED APPLICATIONS

This application claims priority from U.S. Provisional Patent Application No. 62/293,778 filed on the 11$^{th}$ of Feb. 2016, entitled SYNCHRONOUS AUDIO EMITTER AND RECEIVER, by Stéphanie England, and Canadian patent application 2,924,443 filed on the 22$^{nd}$ of Mar. 2016, entitled AUDIO TRANSMITTER AND RECEIVER, by Stephanie England.

TECHNICAL FIELD

This application relates to audio devices in general, and to an audio transmitter and receiver, in particular.

BACKGROUND

WAV (Windows™ Wave audio format/file extension) and FLAC (Free Lossless Audio CODEC (Compression/Decompression Module (usually applied to audio data))) audio files may not be supported by all kinds of Bluetooth™-type transmitters. More generally, a loss of quality or a compression at the average rate (Bitrate) of the audio file is experienced by audiophiles and fans of music such that they may be limited in the choice of analog audio and microphone technologies that are wire based in order to achieve high quality lossless audio. There therefore is a need for a lossless high quality distortion free wireless audio transmitter and receiver.

SUMMARY

According to one aspect of the present application, there is provided an audio transmitter receiver device comprising: an audio interface providing an audio signal, the audio signal including at least one of an audio input signal and an audio output signal; a digital communications interface for at least communicating audio information; and an audio codec for transcoding the audio information such that the audio information includes at least a high quality distortion free lossless representation of the audio signal and the audio signal includes an audio representation of the audio information.

Other aspects and features of the present application will become apparent to those ordinarily skilled in the art upon review of the following description of specific embodiments of a audio transmitter and receiver in conjunction with the accompanying drawing figures.

BRIEF DESCRIPTION OF THE DRAWINGS

Embodiments of the present invention will now be described, by way of example only, with reference to the accompanying drawing figures, wherein.

Like reference numerals are used in different figures to denote similar elements.

DETAILED DESCRIPTION OF THE DRAWINGS

Figure 1:
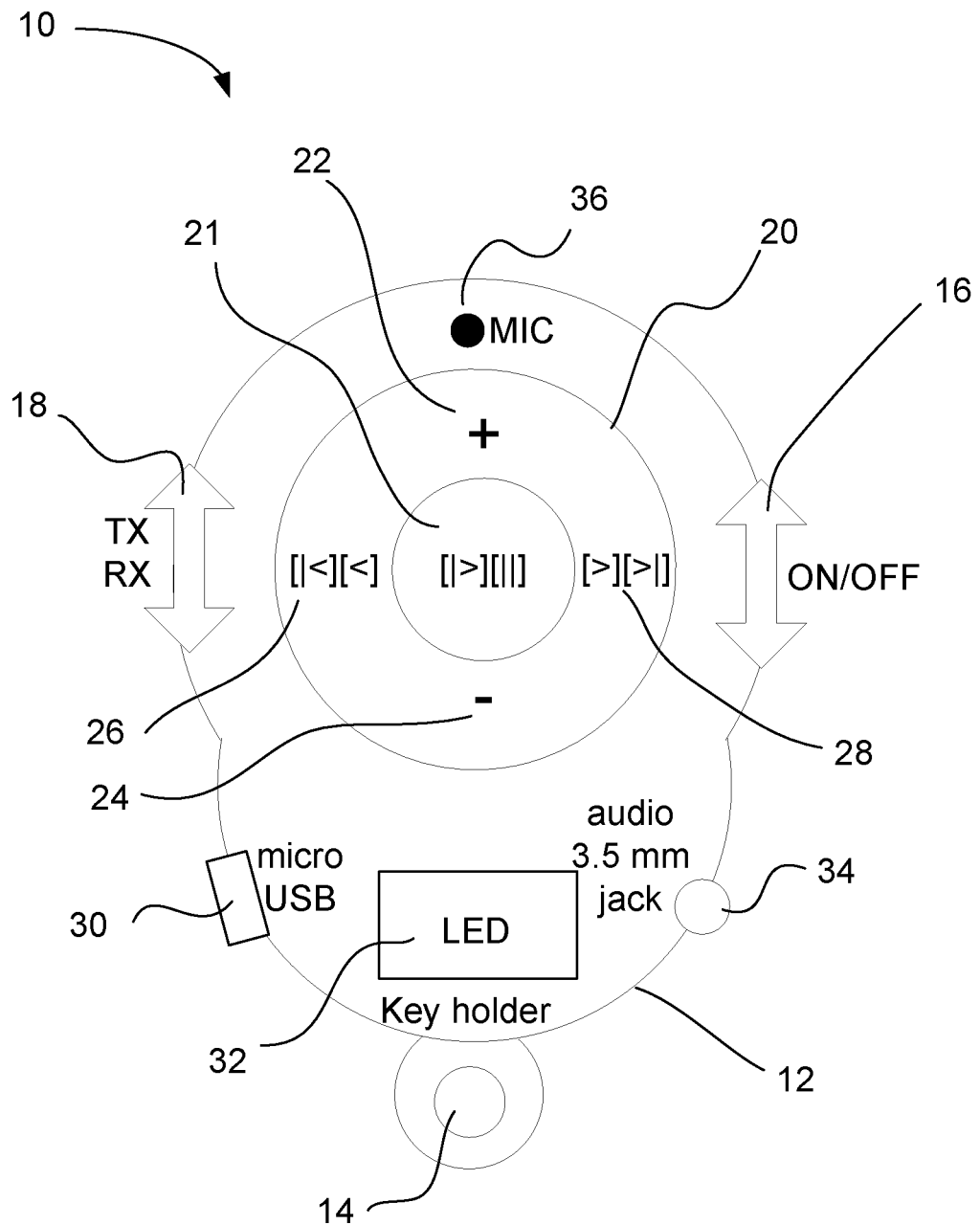
FIG. 1 illustrates an embodiment of a device provided in accordance with the present application.

Described herein are embodiments of a device that emits and receives audio, microphone data, and controls synchronously. In alternate embodiments, it also allows to support the following types of codec audio files: Ogg Vorbis (by the Xiph.Org Foundation), MPEG (Moving Picture Experts Group), MPEG4, AAC (Advanced Audio Coding), WMA (Windows Media Audio), WAV and FLAC. These last two may not yet be supported by all kinds of Bluetooth-type transmitters: decoding the FLAC and WAV files with a loss of quality or a compression at the average rate (Bitrate) of the audio file. This results in that audiophiles and fans of music are restricted to use all types of analog audio and microphone technologies. This also ensures not to lose the quality between the transfer and reception of their audio files.

Advantageously all types of users may benefit from alternative embodiments that have a high quality sound without audible loss with all files, including now, WAV and FLAC formats. This enables users to get rid of the wires and use all forms of audio (analog) or digital wireless technology: very useful in the car, for driving hands free safely and for video game consoles (Controllers and Wireless headsets), to name but a few examples.

In some embodiments, the device has a button to raise and lower the volume, another button to stop or resume an audio file (or a phone call in the case of a cellular phone), with a microphone to transmit sound if necessary and if compatible with the receiver device (Rx). In some embodiments, in order to make the device user friendly, the device has a green, yellow, and red L.E.D. light. In some embodiments, there is a micro USB port for recharging and/or syncing the device, and there is a 3.5 mm audio jack to connect various device types and/or to charge the device.

In some embodiments, if the Green light flashes twice quickly, it means that the device is on. The yellow light remains on while the device is pairing but turns off when the pairing to another device is done. If the red light flashes twice it means that the device is off. The combined 3 lights flashing simultaneously mean that the rechargeable battery needs to be recharged.

Disclosed herein are embodiments of a device that emits and transmits audio files with quick commands that are simple and practical. Whether it is for sports, music, watching TV, the computer or performing a manual or other activity, it allows one to avoid audio connections with wires and adapts them to be wireless. Specifically, this application is to bring both WAV and FLAC formats that could not be decoded without having a wire without any quality loss. It is now possible and more practical.

In some embodiments, there is a clip that allows the device to hold on a fabric or to attach on the headphones themselves. It can be useful for a sound system at home, for older car radios or other devices with just 3.5 mm audio input jack. The device helps to get rid of bulky wires, while keeping adequate sound quality to each and every type of popular formats used today.

In some embodiments, the device is clipped on to the headphones with the audio adaptor (2.5 mm to 3.5 mm or 3.5 mm to 3.5 mm).

In some embodiments, the device is provided as a kit including: 1×Adaptor 2.5 mm to 3.5 mm universal; 1×Retractable cable 2.5 mm to 3.5 mm; 1×Adaptor 3.5 mm to 3.5 mm universal; 1×Retractable cable 3.5 mm á 3.5 mm; 1×Micro USB (Universal Serial Bus) to USB cable; 1×Clip the slides to tighten onto cloth or other surface; 1×Ring for keychain 1×3M™ stickers; and 1×Rubber protective case (waterproof) in various colours.

Referring to the drawings, FIG. 1 illustrates an embodiment of a device provided in accordance with the present application. Device 10 includes a housing 12 (waterproof in some embodiments) featuring a key holder 14 an on/off switch 16 a TX/RX (Transmit/Receive) switch 18, an audio command control 20 including controls for: play/pause/resume 21, volume up (+) 22, volume down (−) 24, back reverse 26, and next forward 28. A micro USB port 30 is provided to charge and/or sync the device, as well as an LED (Light Emitting Diode) display 32, an audio 3.5 mm jack 34, and a microphone 36. The 3.5 mm jack 34 can be used in some embodiments to charge the device.

Figure 2:
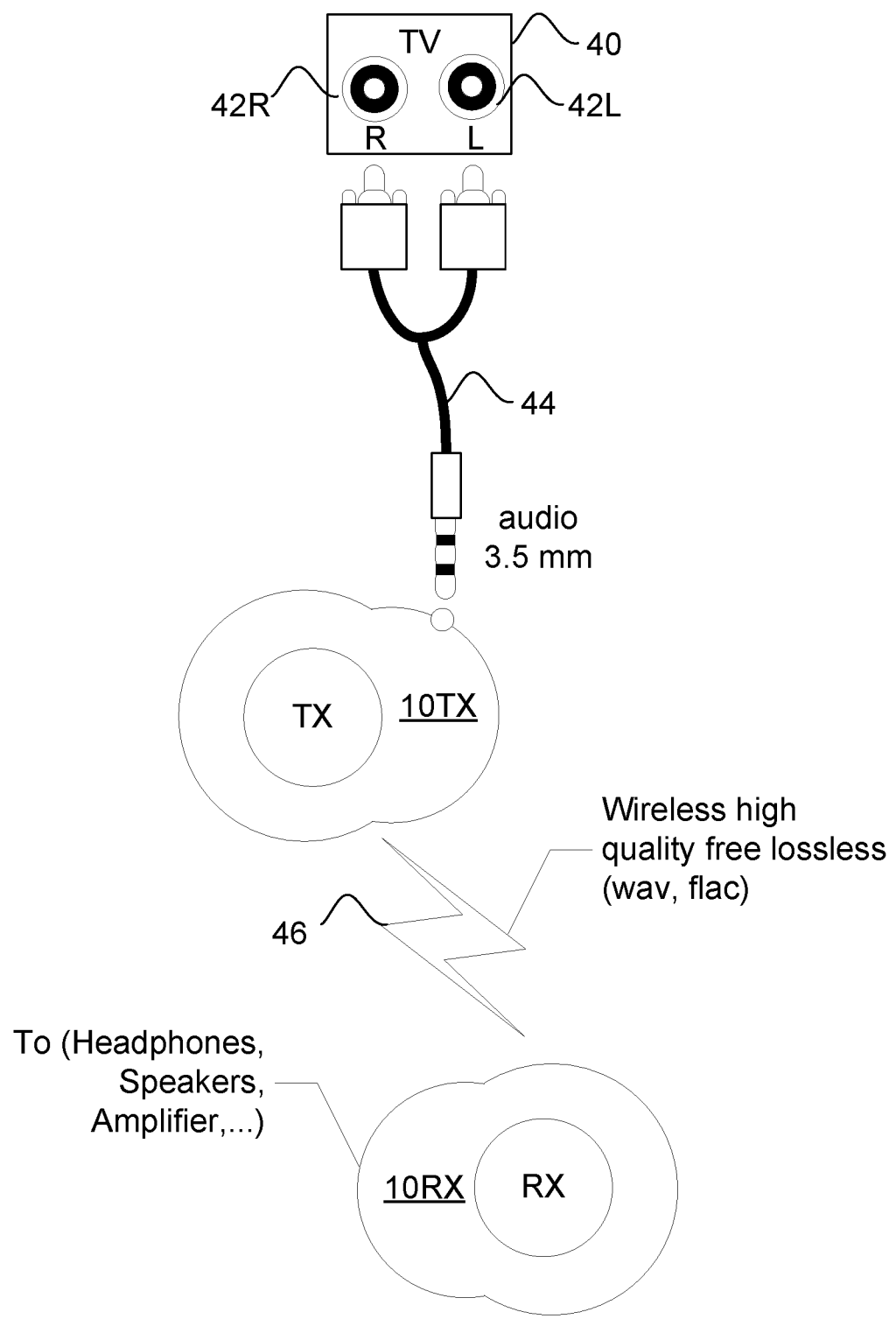
FIG. 2 illustrates two embodiments of devices provided in accordance with the present application, co-operating to communicate high quality audio wirelessly from a TV to another device.

FIG. 2 illustrates two embodiments of devices provided in accordance with the present application, co-operating to communicate high quality audio wirelessly from a TV (Television) to another device. TV 40 includes left 42L and right 42R audio connectors. Cable 44 connects device 10TX to the TV 40 using the left 42L and right 42R audio connectors via the 3.5mm audio jack of device 10TX. Device 10TX advantageously transmits wireless high quality free lossless audio to device 10RX that can be connected or integrated into headphones, speakers, an amplifier, or any other suitable audio end point. As used herein and in the appended claims, the terms wireless high quality free lossless audio (WHQFL) means wireless audio information that, when found in its analog counterpart, is substantially of high quality, substantially distortion free, and substantially lossless, such as but not limited to WAV or FLAC over a wireless medium.

Figure 3:
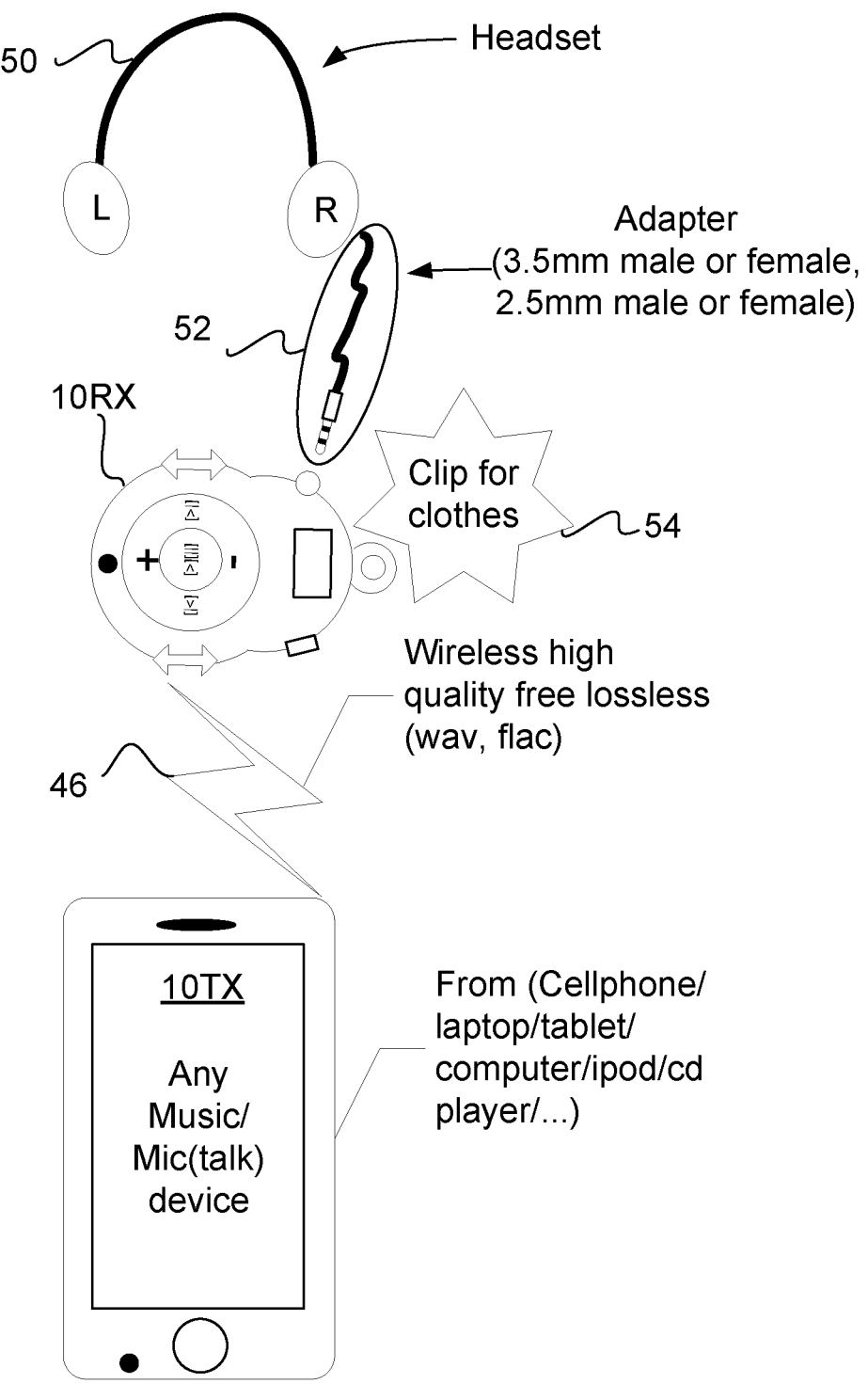
FIG. 3 illustrates an embodiment of a device provided in accordance with the present application, co-operating with another device to communicate high quality audio wirelessly with a headset.

FIG. 3 illustrates an embodiment of a device provided in accordance with the present application, co-operating with another device to communicate high quality audio wirelessly with a headset. Device 10TX is any music, mic(talk) device that integrates aspects of the present application such as a cellphone, laptop, tablet, computer, iPod, cd player or other suitable audio end point that due to the integration of aspects of the present application is able to communicate wireless high quality free lossless audio, such as way or flac, to device 10RX. An adapter 52 is optionally provided for adapting headset 50 to the audio jack of device 10RX, such as for example a 3.5 mm or 2.5 mm male or female adapter. A clip 54 is optionally provided for attaching device 10RX onto the clothes of a user. Clip 54 may be integrated into adapter 52. For applications requiring the use of a microphone or audio controls, the user of headset 50 is enabled to use any of those features needed and absent in headset 50 and advantageously provided by device 10RX that are absent from headset 50.

Figure 4:
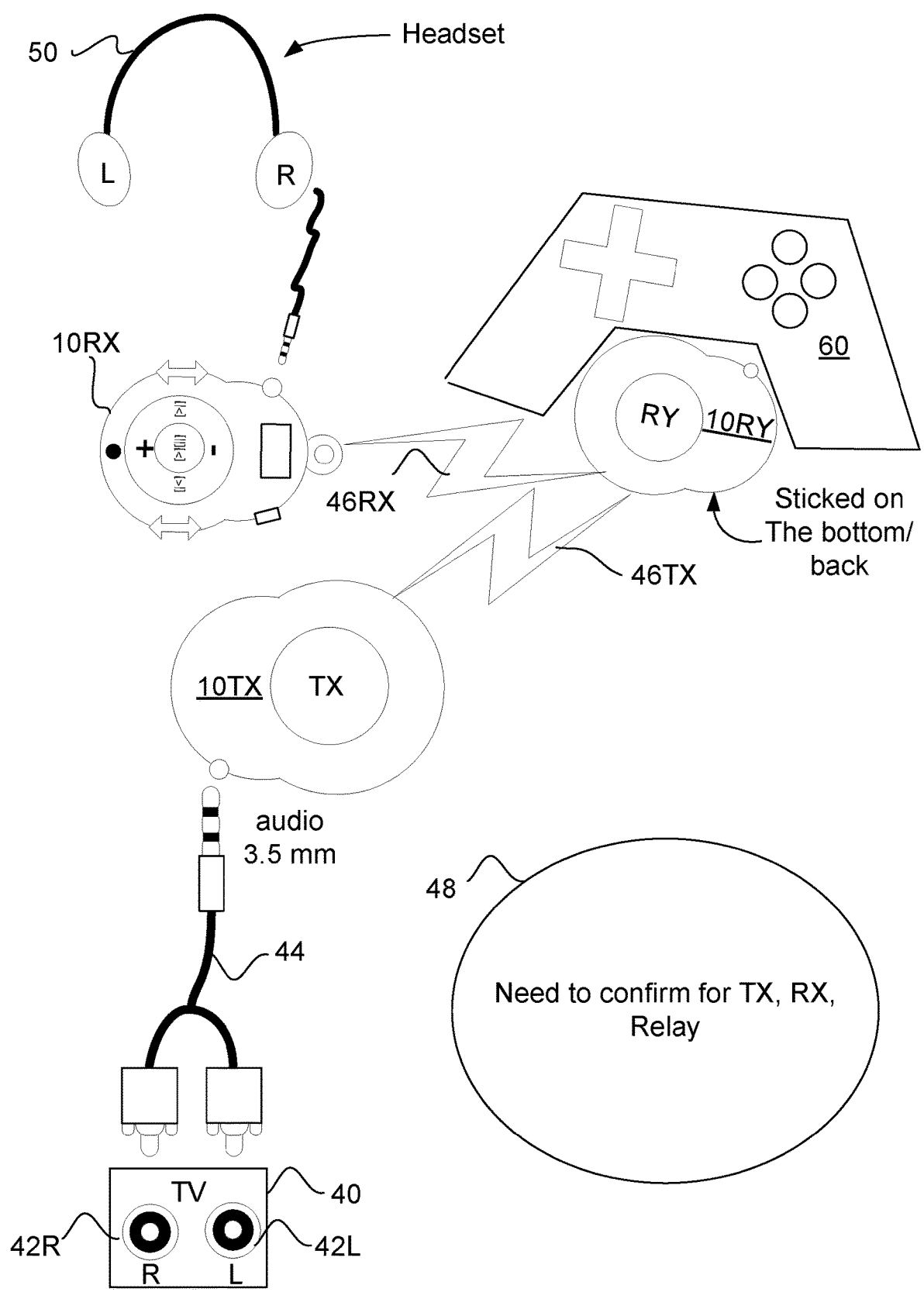
FIG. 4 illustrates two embodiments of devices provided in accordance with the present application, co-operating, and optionally co-operating with a third embodiment of a device provided in accordance with the present application, to communicate high quality audio wirelessly between a TV and a headset.

FIG. 4 illustrates two embodiments of devices provided in accordance with the present application, co-operating, and optionally co-operating with a third embodiment of a device provided in accordance with the present application, to communicate high quality audio wirelessly between a TV and a headset. Cable 44 connects device 10TX to the TV 40 using the left 42L and right 42R audio connectors via the 3.5mm audio jack of device 10TX. Device 10TX advantageously transmits wireless high quality free lossless audio. This audio is optionally received by device 10RY that is advantageously integrated with video game controller 60, which then advantageously re-transmits wireless high quality free lossless audio to device 10RX that is connected to headphones 50. Thus, device 1ORY acts as a relay to further ensure that wireless high quality free lossless audio arrives at device 10RX. Optionally, and advantageously, device 10RY may mix in and integrate audio from video game controller 60, before transmitting the audio from TV 40 to device 10RX and ultimately headset 50. Optionally, the user will need to confirm for TX, RX, Relay 48 mode changes.

Figure 5:
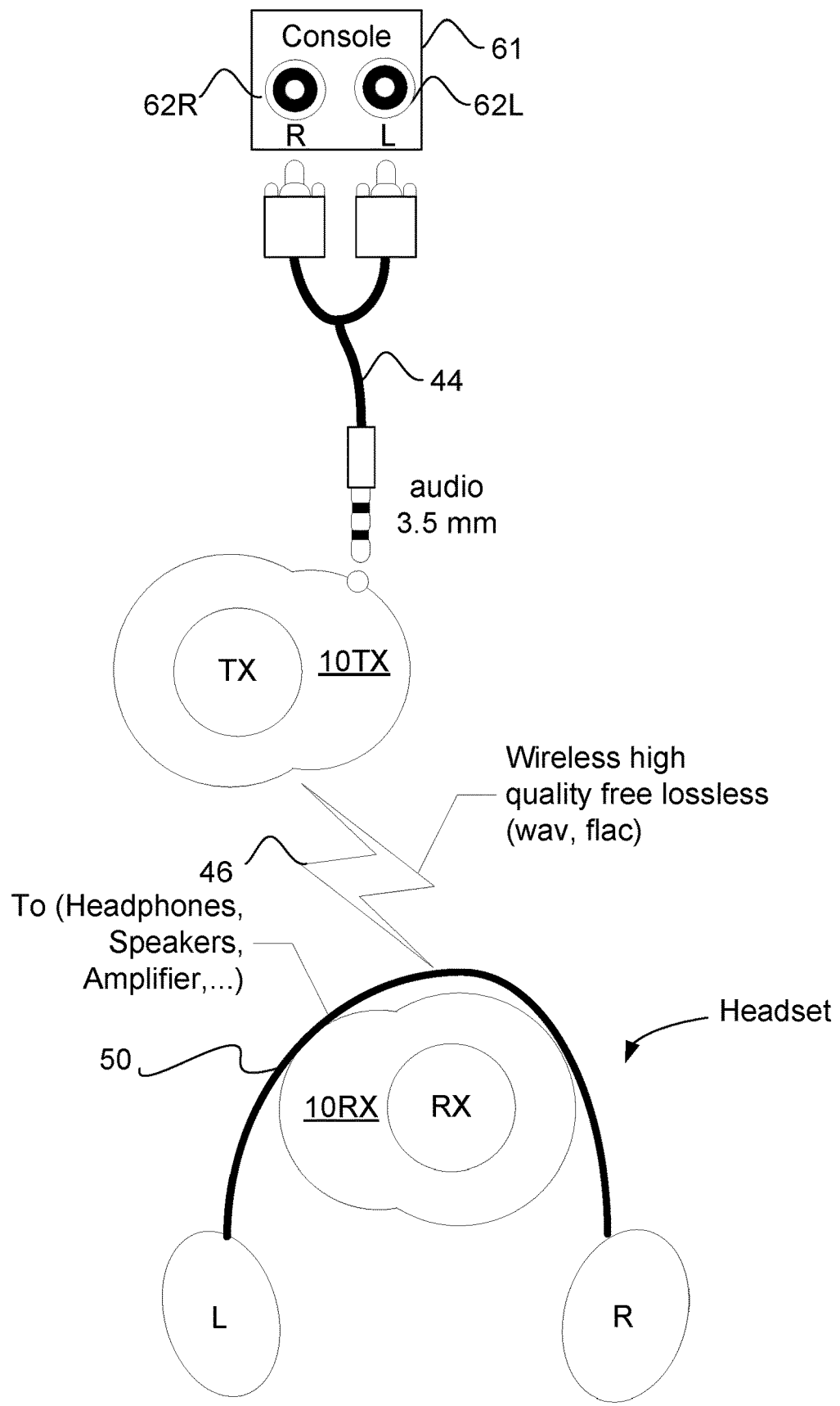
FIG. 5 illustrates an embodiment of a device provided in accordance with the present application, co-operating with another device to communicate high quality audio wirelessly with a headset.

FIG. 5 illustrates an embodiment of a device provided in accordance with the present application, co-operating with another device to communicate high quality audio wirelessly with a headset. Cable 44 connects device 10TX to video game console 61 using the left 62L and right 62R audio connectors via the 3.5 mm audio jack of device 10TX. Device 10TX advantageously transmits wireless high quality free lossless audio to device 10RX that is integrated into headset 50, or into speakers, an amplifier, or any other suitable audio end point.

Figure 6:
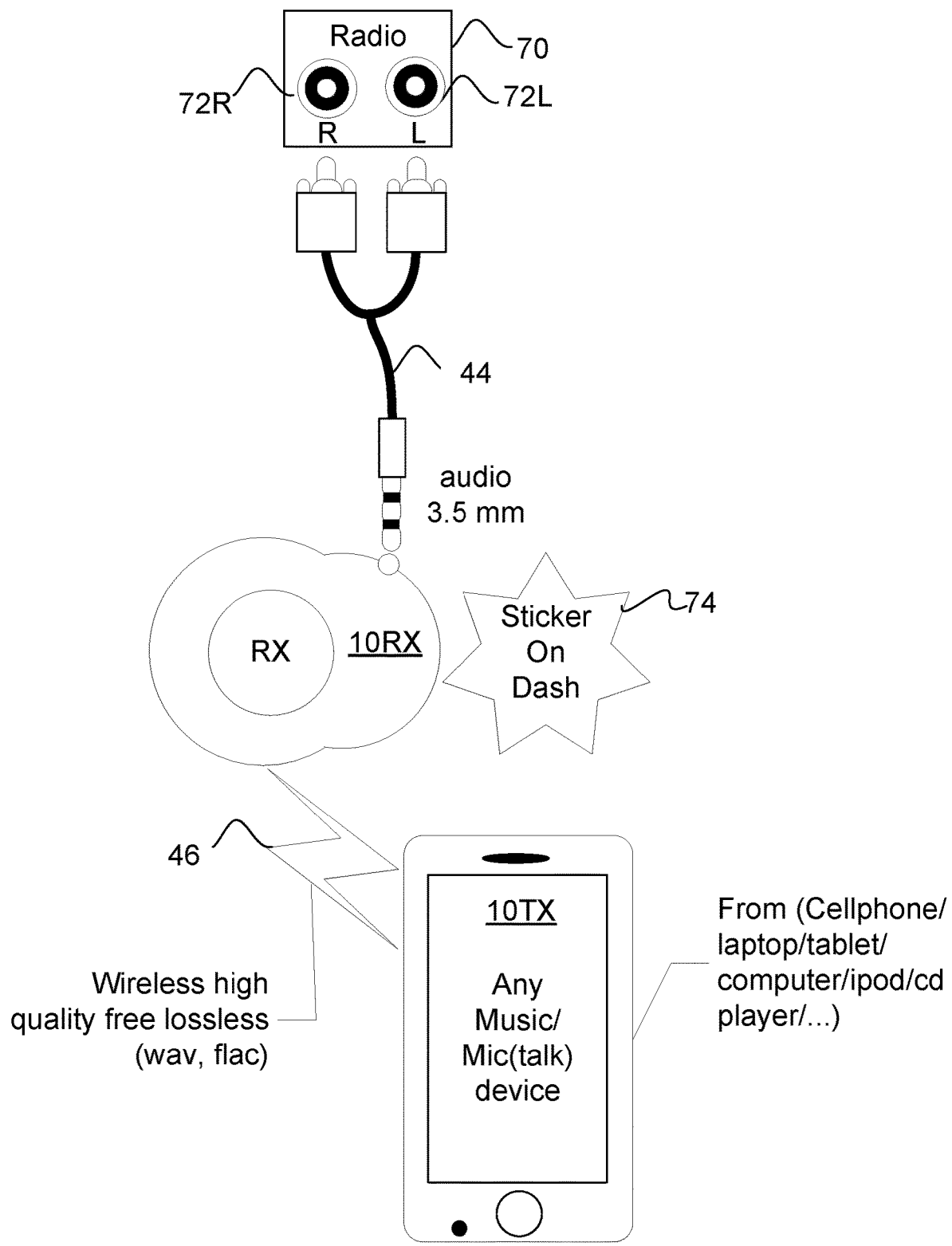
FIG. 6 illustrates an embodiment of a device provided in accordance with the present application, co-operating with another device to communicate high quality audio wirelessly with a radio.

FIG. 6 illustrates an embodiment of a device provided in accordance with the present application, co-operating with another device to communicate high quality audio wirelessly with a radio. Cable 44 connects device 10RX to Radio 70 using the left 72L and right 72R audio connectors via the 3.5 mm audio jack of device 10RX. Optionally a sticker 74 (double-sided or alternatively a vent clip integrated on the back of the device or provided as a separate accessory) is provided to fix device 10RX onto the dash of the car where Radio 70 is located. In this example, the term Radio is intended to mean the stereo found in a car that typically has an auxiliary interface for at least receiving audio input to be amplified and played back over the car speakers. Advantageously, device 10TX such as a cellphone, laptop, tablet computer, iPod™(an audio player), CD (Compact Disc) player or any other suitable audio end point is enabled to communicate 46 wireless high quality free lossless audio to be played back over the car speakers.

Figure 7:
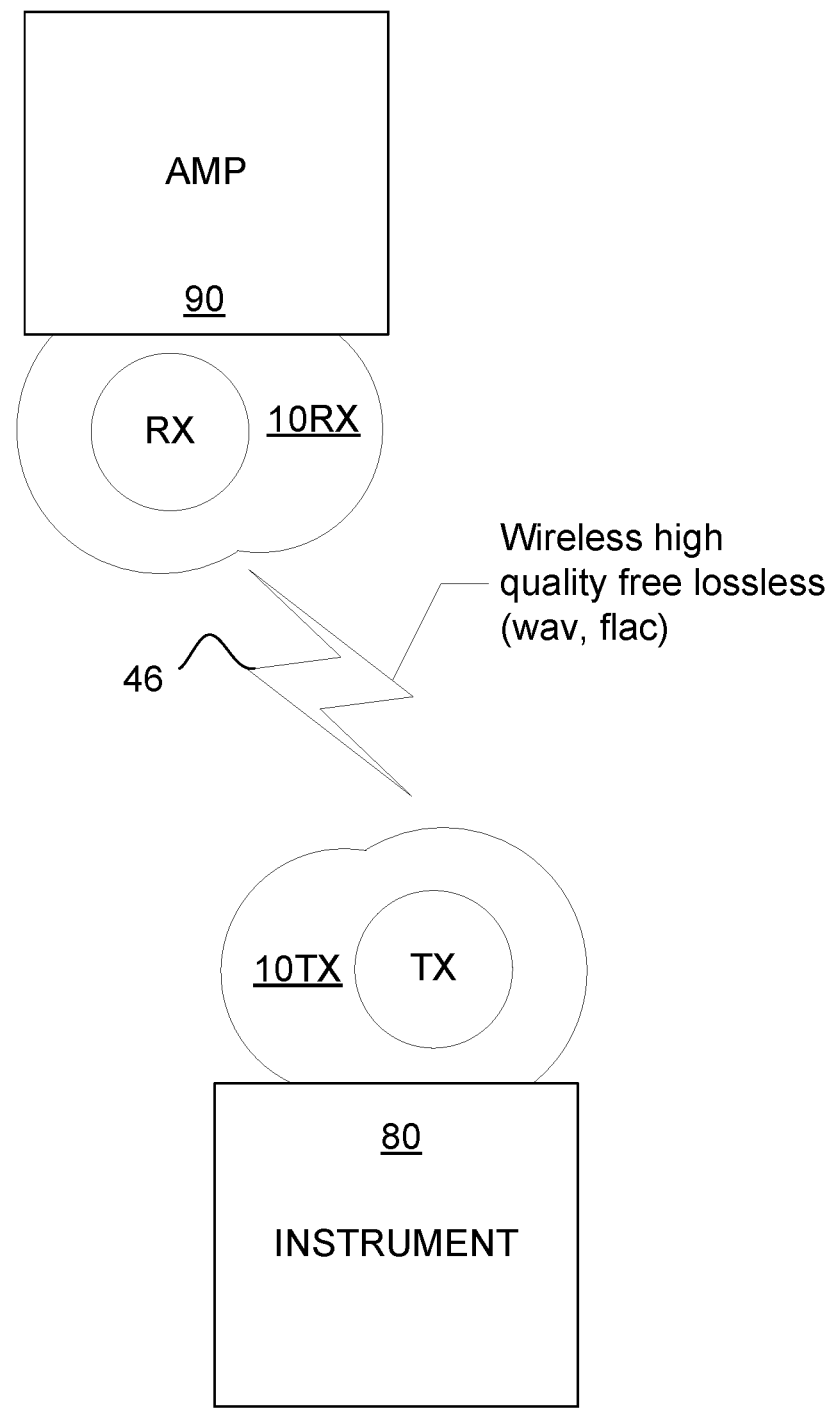
FIG. 7 illustrates two embodiments of devices provided in accordance with the present application, co-operating to communicate high quality audio wirelessly between an instrument and an amplifier.

FIG. 7 illustrates two embodiments of devices provided in accordance with the present application, co-operating to communicate high quality audio wirelessly between an instrument and an amplifier. Advantageously, instrument 80 is enabled by device 10TX to communicate wireless high quality free lossless audio to amp (amplifier) 90 that is enabled to receive the same via device 10RX. Devices 10TX and 10RX can be either integrated into instrument 80 or amp 90 respectively, or operate as discrete and separate devices that are connected locally via the 3.5 mm audio jack.

Figure 8:
FIG. 8 illustrates an embodiment of user interface elements of a device provided in accordance with the present application.
Figure 8:
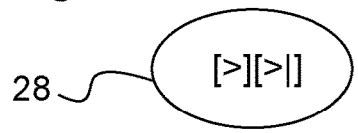
Figure 8:
Figure 8:
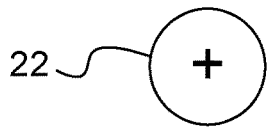
Figure 8:
Figure 8:
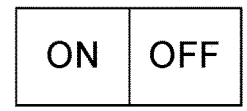
Figure 8:
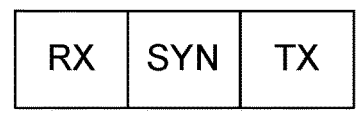

FIG. 8 illustrates an embodiment of user interface elements of a device provided in accordance with the present application. As illustrated, there is provided an on/off switch 16 a TX/RX switch 18 with an optional SYN (Synchrone) position, controls for: play/pause/resume 21, volume up (+) 22, volume down (−) 24, back reverse 26, and next forward 28. LED 32 includes red, yellow and green lights. A micro USB 30 connector is provided, as well as an audio 3.5 mm jack 34, and a mic 36.

Operationally, in some embodiments, in order to pair device 10 with a computer or other similar device acting as an audio end point such as a media player, a user would begin by opening settings for the Bluetooth option on their computer or PC (Personal Computer). In a disconnected state from the PC, the LED 32 red and blue lights are flashing constantly. After initiating pairing with the computer, there may be a slight delay connecting to device 10, but within a few seconds after it's paired with the PC audio settings, then audio is back on the device 10 via Bluetooth once the audio has reconnected automatically back to the device 10. Any "pause" or delay is due to the pairing time.

In some embodiments, when an audio cable is disconnected physically from the 3.5 mm jack 34 of device 10, advantageously the audio "stops" playing on the media player (or PC for example), and switches back to the audio out (speaker or headphones) at the PC.

In some embodiments, after a second or so, audio output goes back on Bluetooth connection to the device 10 and from the media player (or PC for example) when the main play/pause/resume 21 button is clicked once quickly.

In some embodiments, when everything is already "well set and connected with no interruption" clicking the main play/pause/resume 21 button, volume up (+) 22, volume down (−) 24, back reverse 26, and next forward 28 makes the respective functions happen on the PC: play/pause, volume up, volume down, backward, forward.

In some embodiments, when a blue LED 32 light is flashing, this indicates audio is playing and synchronized with another device: device with blue LED 32 light flashing is a received device 10RX and the other audio device is a transmit device 10TX.

In some embodiments, when the red light is "holding on", this indicates that the device is recharging.

In some embodiments, pressing the main play/pause/resume 21 button for a long time, such as 9 seconds, on both receive device 10RX and transmit device 10TX at the same time, the devices advantageously automatically recognise and connect with each other.

In some embodiments, the charge time is 1 hour when directly charging on a wall plug via USB to Micro USB port 30.

In some embodiments, the 3.5 mm jack 34 can also be used as a charging port while music is playing, it recharges the internal battery.

In some embodiments, the micro USB 30 connector can also be used as a synching port.

In some embodiments, housing 12 is water resistant.

In some embodiments, the LED 32 screen could be used for pairing list of other devices. For example device 10TX could pair with the other receiving devices 10RX in this situation.

In some embodiments, a vocal command is used to pair devices 10.

Figure 9:
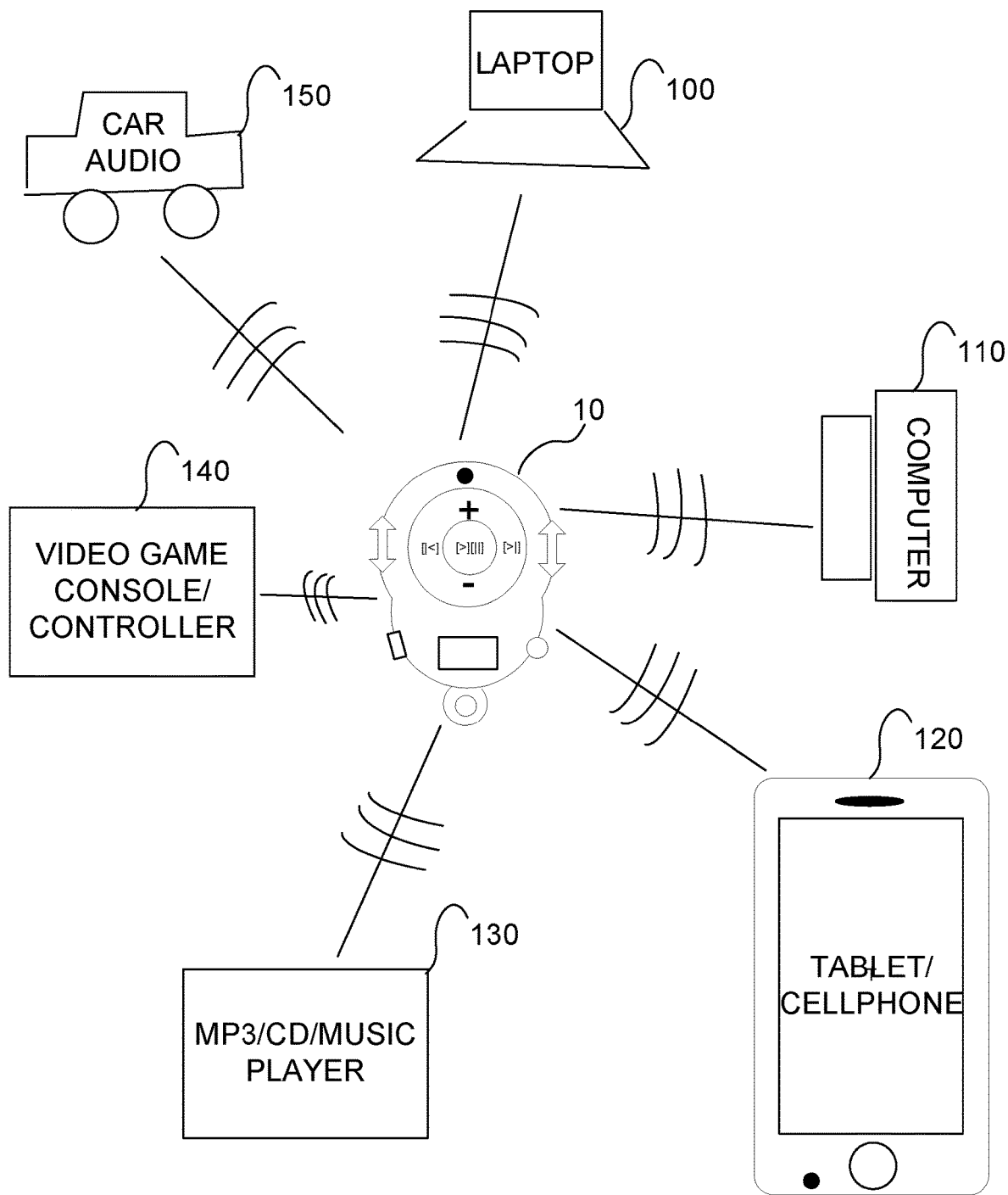
FIG. 9 illustrates an embodiment of a device provided in accordance with the present application, co-operating with multiple audio end point devices.

FIG. 9 illustrates an embodiment of a device provided in accordance with the present application, co-operating with multiple audio end point devices. Advantageously, device 10 enables wireless high quality lossless free audio for any suitable audio end point device such as laptop 100, computer 110, tablet/cellphone 120, mp3/cd/music player 130, video game console/controller 140 and car 150, to name but a few examples. Further advantageously, device 10 may optionally mix in the audio from more than one audio end point that it receives from, and may optionally transmit mixed audio to more than one audio end point that it transmits to.

Figure 10:
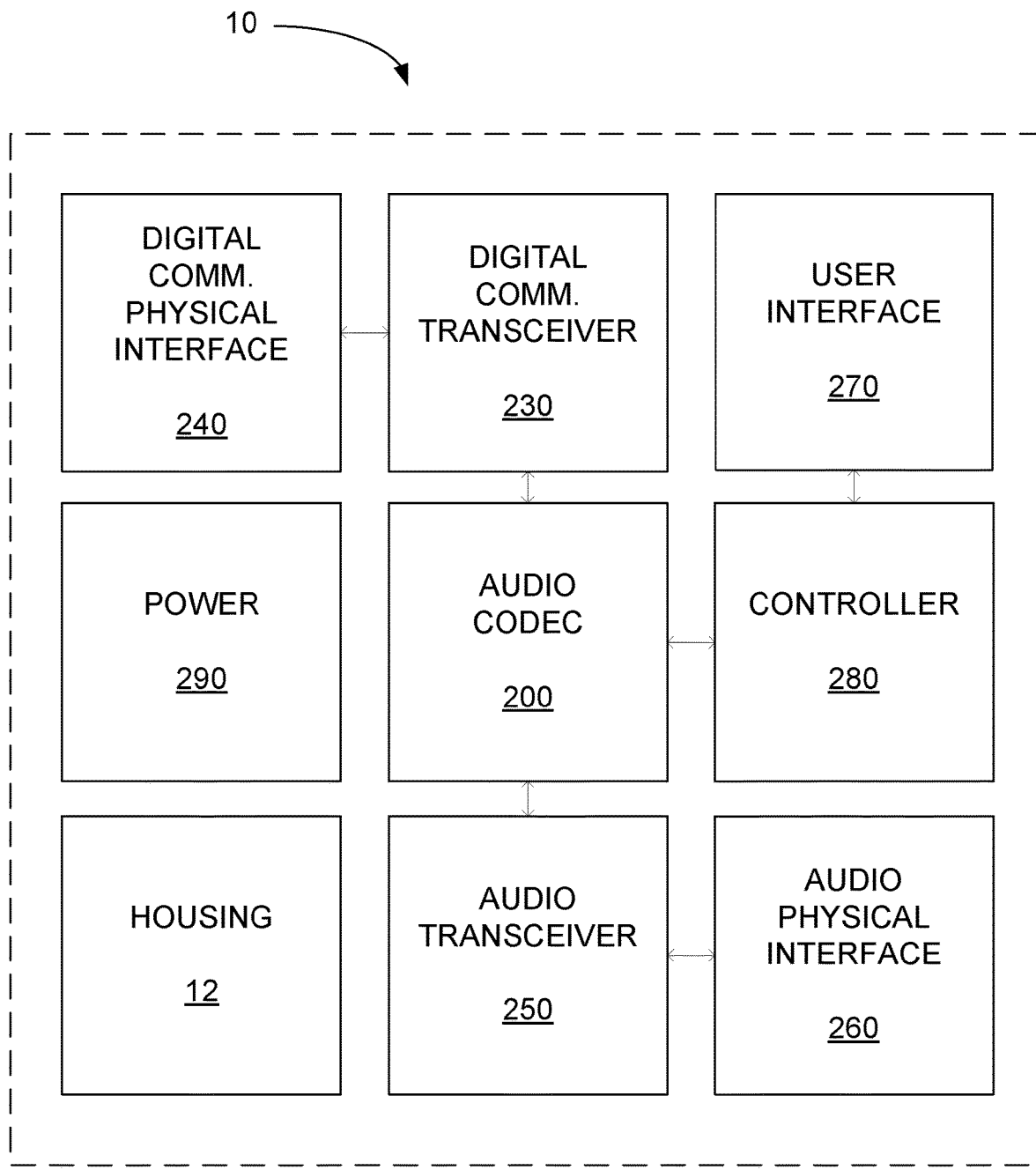
FIG. 10 is a block diagram of an embodiment of a device provided in accordance with the present application.

FIG. 10 is a block diagram of an embodiment of a device provided in accordance with the present application. Device 10 includes within its housing 12 an audio codec 200, digital communications physical interface 240 and digital communication transceiver 230, audio transceiver 250 and audio physical interface 260, user interface 270, controller 280, and power 290. Operationally, high quality lossless free audio signal is received or transmitted via digital communications physical interface 240. This signal is then transceived into or from the digital domain via the digital communications transceiver 230, transcoded to and from the digital signal domain to the audio digital domain via audio codec 200, transceived to and from the audio digital domain from and to the audio analog domain via the audio transceiver 250, and provided or received in the analog audio domain via the audio physical interface 260. The process is automated by the controller 280, taking into account user interaction via user interface 270. All components are powered by power 290.

Figure 11:
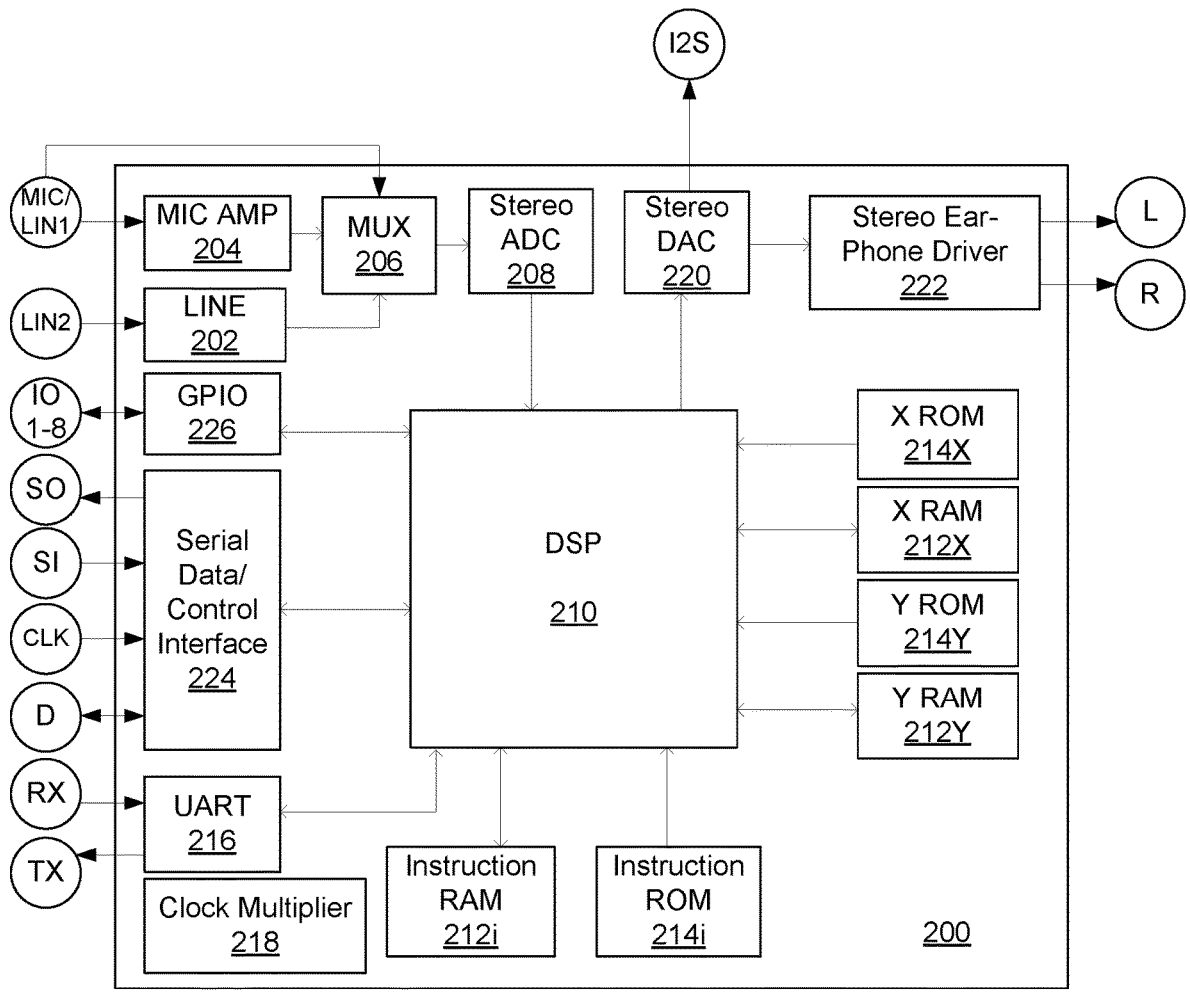
FIG. 11 is a block diagram of an audio codec suitable to be used in some embodiments of a device provided in accordance with the present application.

FIG. 11 is a block diagram of an audio codec suitable to be used in some embodiments of a device provided in accordance with the present application. Audio codec 200 includes LINE 202 input, MIC AMP 204, MUX (Multiplexed) 206, Stereo ADC (Analog to Digital Converter) 208, DSP (Digital Signal Processor) 210, RAM (Random Access Memory) 212*i*, 212X, 212Y and ROM (Read Only Memory) 214*i*, 214X, 214Y, UART (Universal Asynchronous Receiver/Transmitter) 216, Clock Multiplier 218, Stereo DAC (Digital Analog Converter) 220, Stereo Ear-Phone Driver 22, Serial/Data Control Interface 224, and GPIO (General purpose Input Output) 226. A suitable part to use is VS1053b—Ogg Vorbis/MP3/AAC/WMA/MIDI (Musical Instrument Digital Interface) AUDIO CODEC, and any subsequent revisions and replacements thereto, manufactured by VLSI Solution. Although there are many different parts that could be used to implement audio codec 200, as well as many different ways to use the specific part to provide the desired functionality, what follows is an exemplary description of how the Audio code 200 can be used in one embodiment of the present application.

Operationally, at one audio end point, GPIO 226 and or Serial Data/Control Interface 224 are used to determine that the RX/TX switch 18 is in one of a RX or TX position. Consider a first device 10TX where the RX/TX switch 16 is in the TX position. Thus, the device 10TX is configured to receive stereo audio input at line level via LIN1 and LIN2, such as L (Left) analog and R (Right) analog audio input. LINE 202 an MUX 206 are configured to use Stereo ADC 208 to convert the stereo audio input into the digital domain so that it can be processed by DSP 210. DSP 210 executes instructions from RAM 212*i*, or 212X, or 212Y or ROM 214*i*, or 214X, or 214Y such that it transcodes the digital audio into a format that is suitable for transmission over UART 216 via its TX channel and on to the digital communications transceiver 230 and digital communications physical interface 240 as a high quality free lossless format, such as for example way or flac. If any rate conversions are required, Clock Multiplier 218 can be utilised. At the other audio end point, GPIO 226 and or Serial Data/Control Interface 224 are used to determine that the RX/TX switch 16 is in one of a RX or TX position.

Consider a second device 10RX in communication with first device 10TX, where the RX/TX switch 18 is in the RX position. Thus the device 10RX is configured to receive the high quality free lossless format via digital communications physical interface 240, digital communications transceiver 230. At audio codec 200 UART 216 receives the high quality free lossless format via the RX channel of UART 216, and onto DSP 210 for processing. DSP 210 executes instructions from RAM 212*i*, or 212X, or 212Y or ROM 214*i*, or 214X, or 214Y such that it transcodes the high quality free lossless format to digital audio and onto Stereo ADC 220 and Stereo Ear-Phone Driver 222 whereat a high quality lossless free stereo output is provided at L and R. If any rate conversions are required, Clock Multiplier 218 can be utilised.

Figure 12:
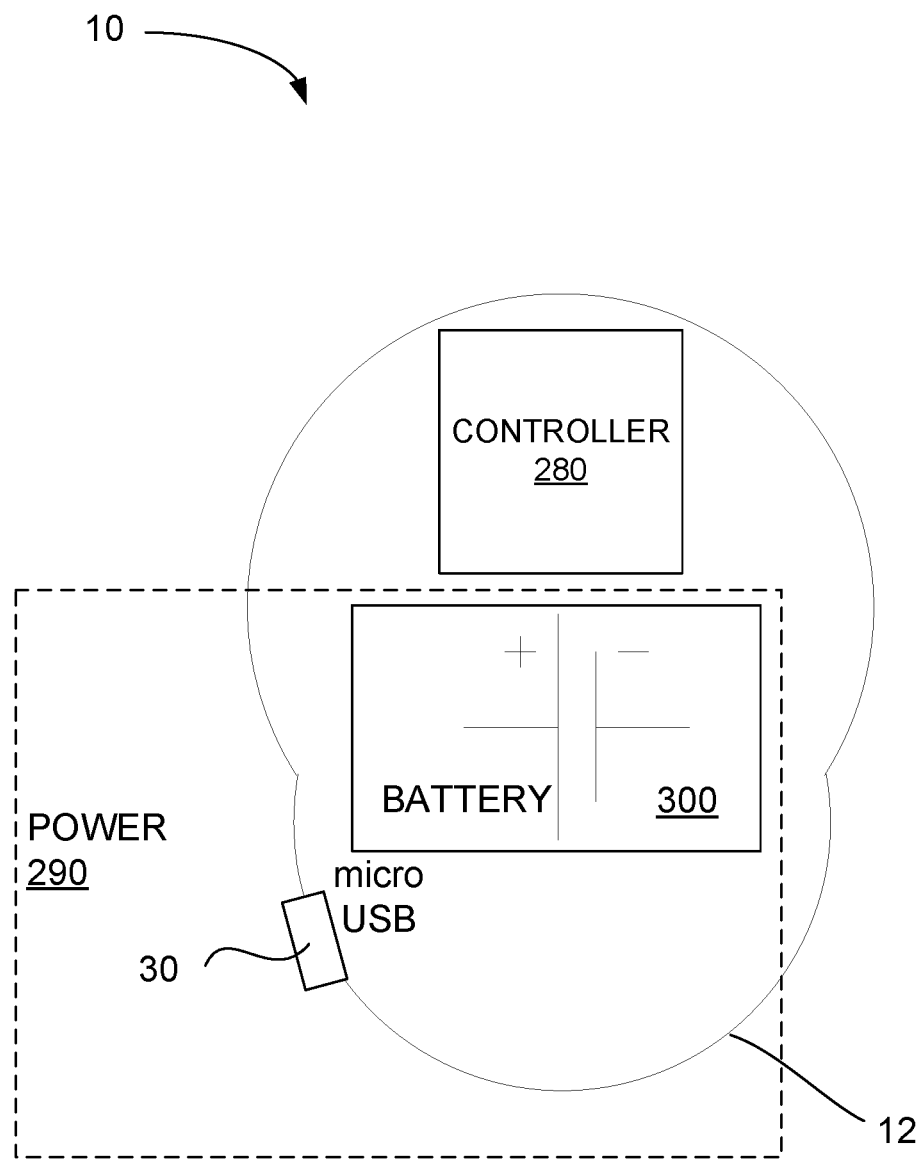
FIG. 12 is a block diagram of a power module suitable to be used in some embodiments of a device provided in accordance with the present application.

FIG. 12 is a block diagram of a power module suitable to be used in some embodiments of a device provided in accordance with the present application. Power block 290 includes battery 300 that is charged by micro USB port 30, or alternatively via 3.5 mm jack 34. Controller 280 oversees the operation of power block 290 such that when device 10 is plugged into a charger via micros USB port 30, the battery 300 is charged, and such that all components within housing 12 are powered adequately.

Figure 13:
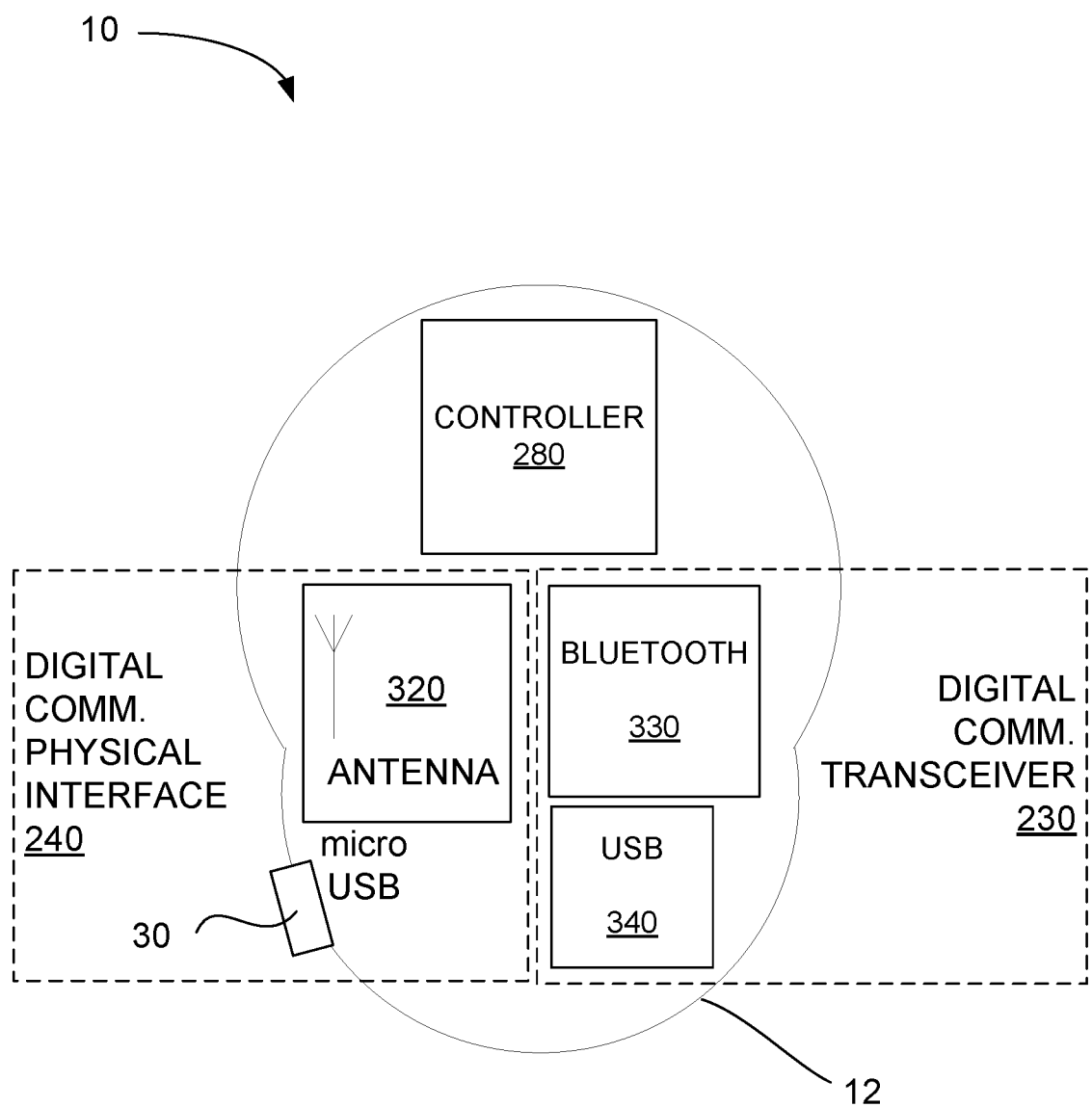
FIG. 13 is a block diagram of a digital communications physical interface and digital communications transceiver suitable to be used in some embodiments of a device provided in accordance with the present application.

FIG. 13 is a block diagram of a digital communications physical interface and digital communications transceiver suitable to be used in some embodiments of a device provided in accordance with the present application. Digital communications physical interface 240 includes Antenna 320 and micro USB port 30. Controller 280 can select which of the two physical interfaces will be utilised by device 10. Digital communications transceiver 230 includes Bluetooth 330 and USB 340, and the appropriate transceiver is determined by controller 280 depending on the application. As used in this specification and in the appended claims, the term Bluetooth and Bluetooth-type mean wireless communication devices, chipsets, and protocols and the like that enable wireless digital communications between devices 10 used as audio end points. As used in this specification and in the appended claims, the term USB and USB-type mean wired communication device, chipsets, and protocols and the like that enable wired digital communications between devices 10 used as audio end points.

Figure 14:
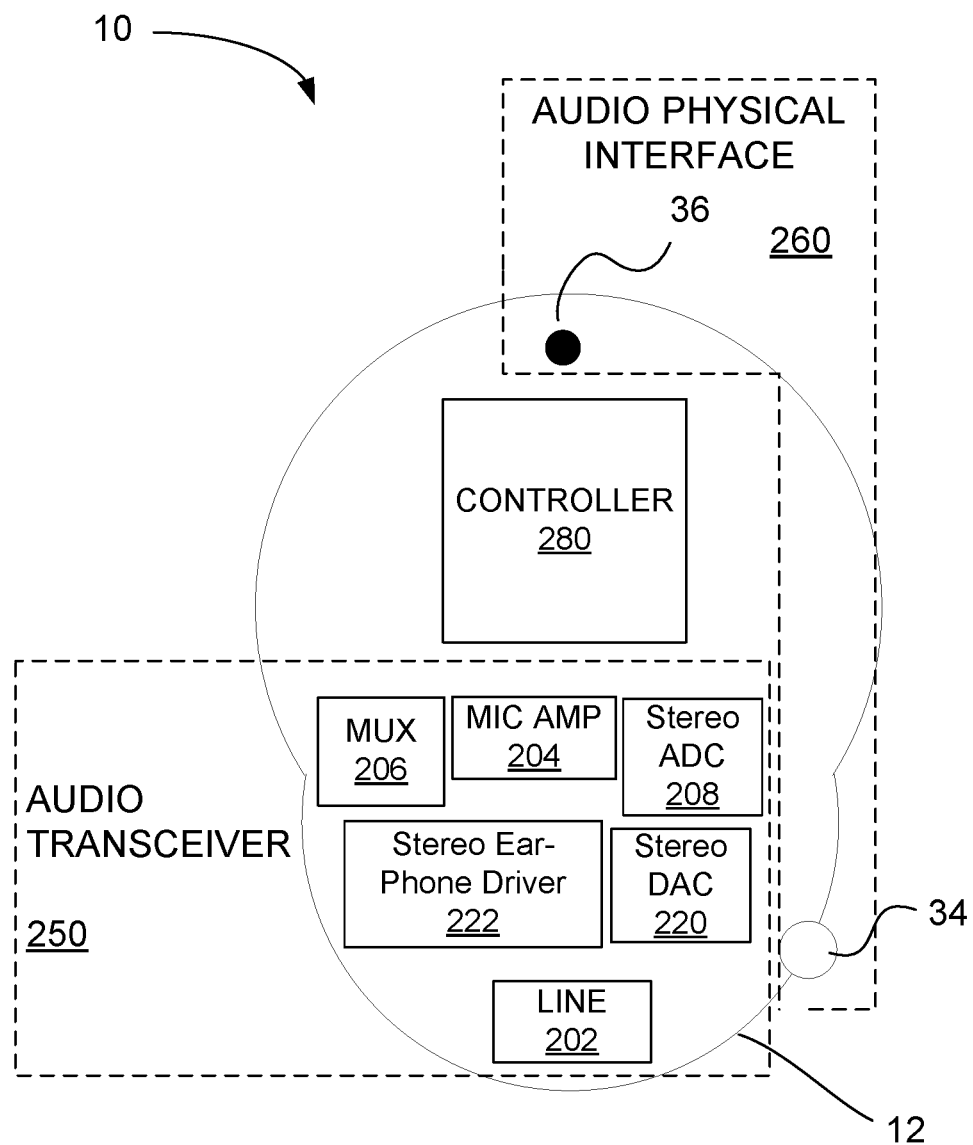
FIG. 14 is a block diagram of an audio physical interface and an audio transceiver suitable to be used in some embodiments of a device provided in accordance with the present application.

FIG. 14 is a block diagram of an audio physical interface and an audio transceiver suitable to be used in some embodiments of a device provided in accordance with the present application. Audio physical interface 260 includes 3.5 mm jack 34 and microphone 36. Audio transceiver 250 includes LINE 202, MIC AMP 204, MUX 206, Stereo ADC 208, Stereo DAC 220, and Stereo Ear-Phone Driver 222.

Figure 15:
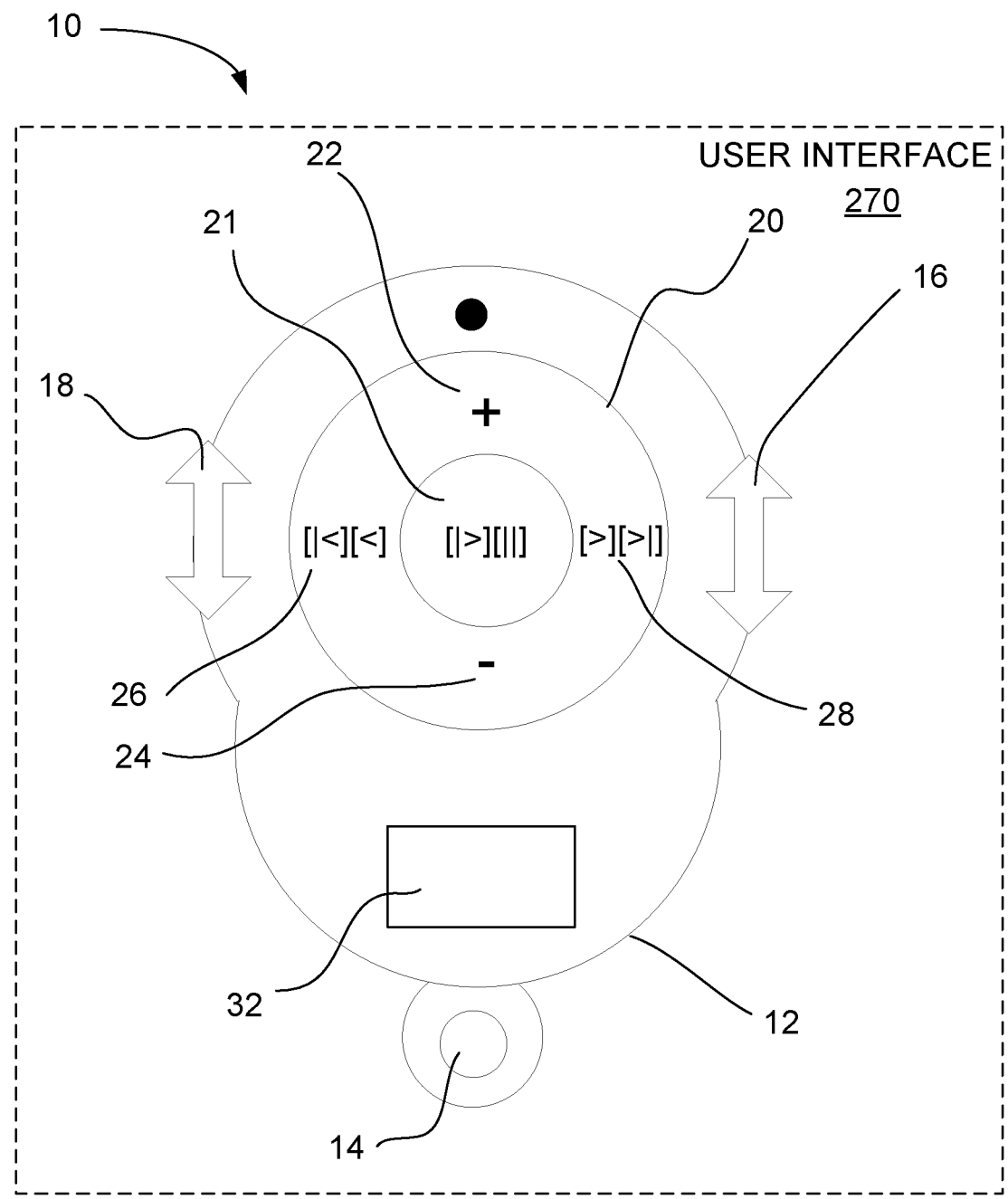
FIG. 15 is a block diagram of a user interface suitable to be used in some embodiments of a device provided in accordance with the present application.

FIG. 15 is a block diagram of a user interface suitable to be used in some embodiments of a device provided in accordance with the present application. User interface 270 includes a key holder 14 an on/off switch 16 a TX/RX switch 18, an audio command control 20 including controls for: play/pause/resume 21, volume up (+) 22, volume down (−) 24, back reverse 26, and next forward 28. A micro USB port 30 is provided, as well as an LED display.

Figure 16:
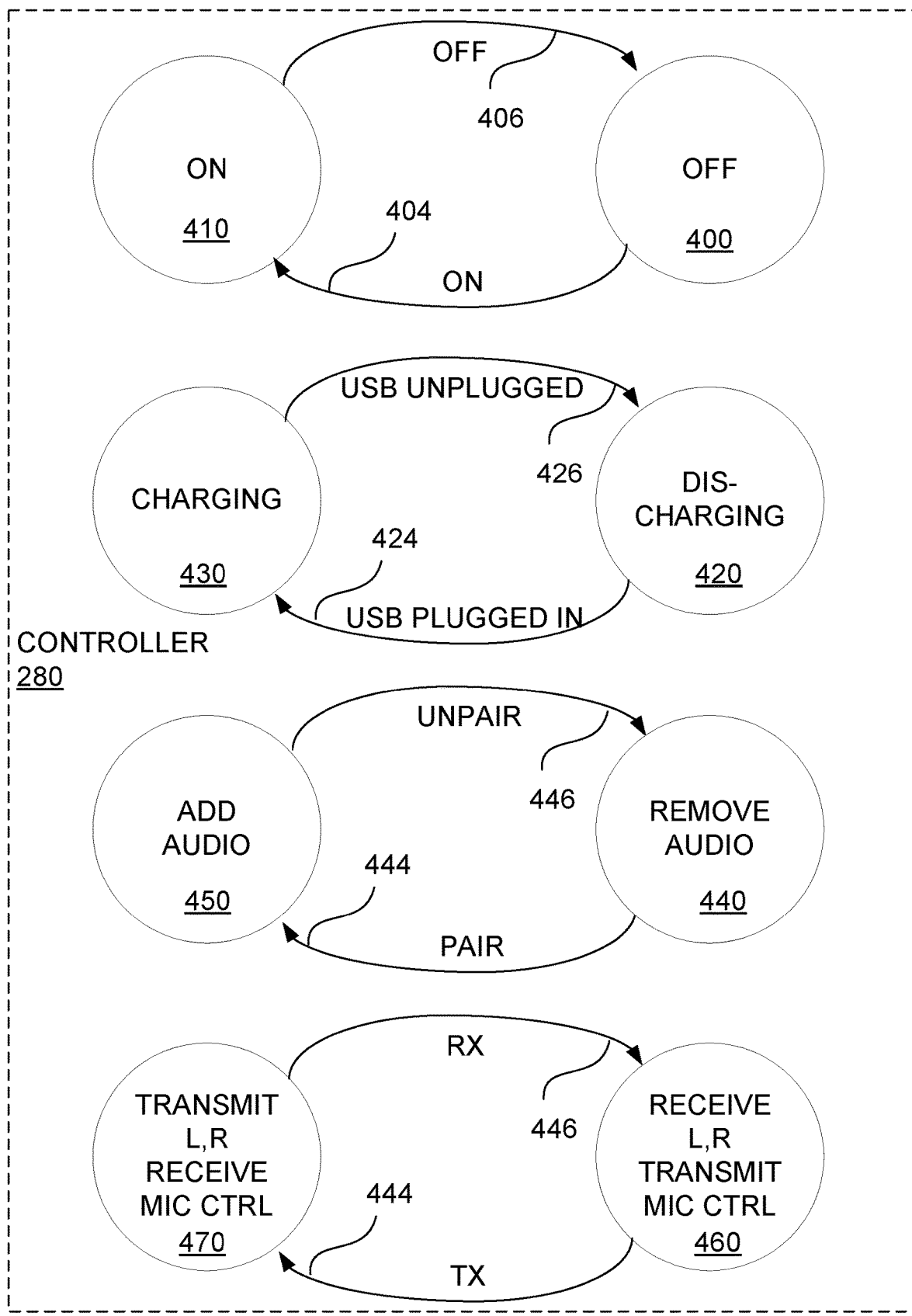
FIG. 16 is an illustration of a controller suitable to be used in some embodiments of a device provided in accordance with the present application.

FIG. 16 is an illustration of a controller suitable to be used in some embodiments of a device provided in accordance with the present application. Starting in the off state 400, when the user operates the on/off switch 16 in the on 404 position, the device goes into the ON state 410. Conversely from the ON state 410, when the user operates the on/off switch 16 in the off 406 position, the device goes into the OFF state 400. Starting in the Discharging state 420, when a USB cable is plugged in 424, the device goes into the Charging state. Conversely from the Charging state 430, when a USB cable is unplugged 424, the device goes into the Discharging state 420. Starting from the Remove audio state 440, when a user pairs 444 another device, the device goes into the add audio 450 state. Conversely from the add audio 450 state, when a user unpairs 446 a device, the device goes into the remove audio 440 state. Starting from the Receive L,R Transmit MIC CTRL 460 state, when the user operates the TX/RX switch 18 in the TX 444 position, the device goes into the Transmit L,R Receive MIC CTRL (Control) 470 state. Conversely from the Transmit L,R Receive MIC CTRL 470 state, when the user operates the TX/RX switch 18 in the RX 446 position, the device goes into the Receive L,R Transmit MIC CTRL 460 state.

Figure 17A:
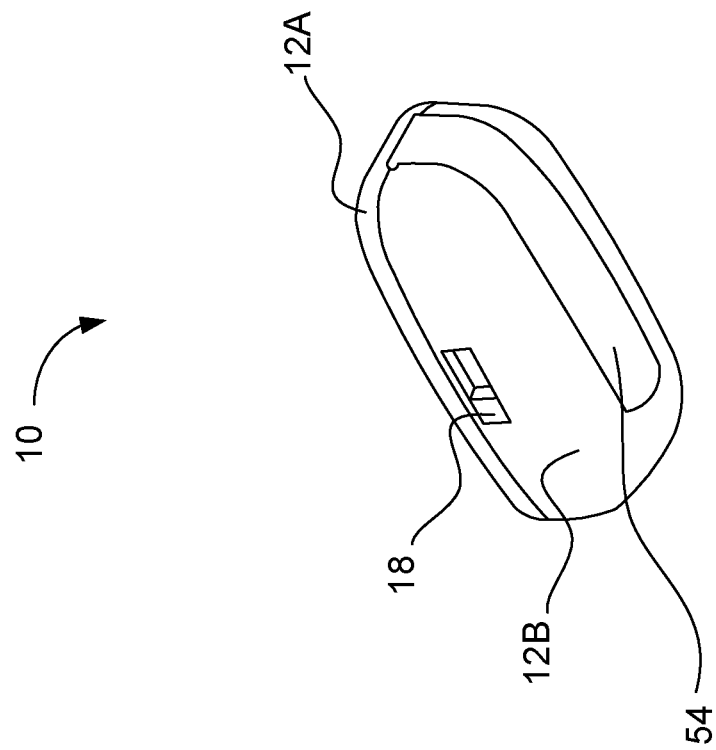
FIG. 17A illustrates a top right perspective view of an embodiment of a device provided in accordance with the present application.
Figure 17B:
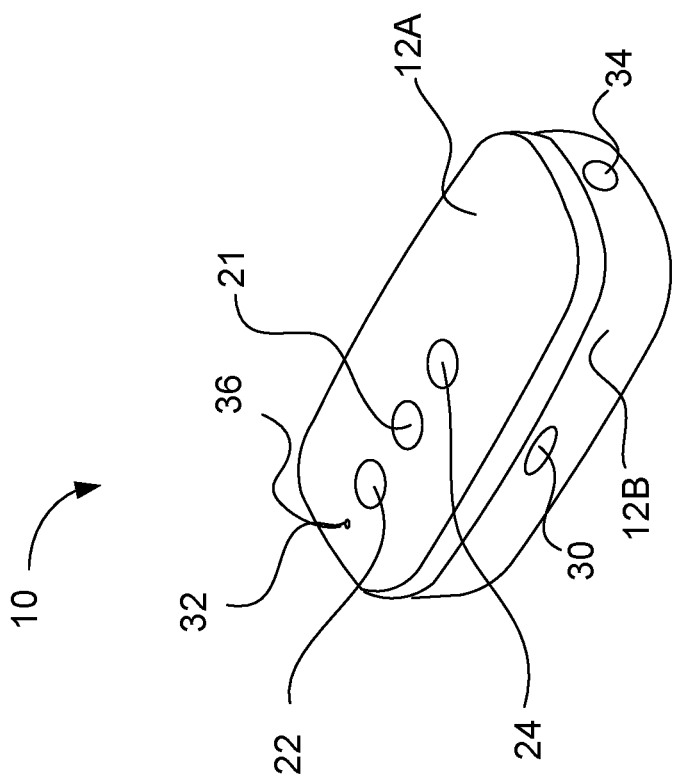
FIG. 17B illustrates a bottom left perspective view of an embodiment of a device provided in accordance with the present application.

FIGS. 17A and 17B illustrate top left and bottom right perspective views of an embodiment of a device provided in accordance with the present application. Device 10 includes a housing 12 made in two parts, a top part 12A and a bottom part 12B. The two-parts facilitate manufacturing and improve hand-held operation: the substantially flat top part 12A makes it easy for a user to locate and operate the controls, as well as providing a flat surface for the microphone port to improve microphone input, whereas the substantially rounded bottom part 12B rests well in a cusped hand or the palm. A TX/RX switch 18 is provided as well as a simplified audio command control including controls for: play/pause/resume 21, volume up (+) 22, volume down (−) 24. As compared to the audio command control 20 of FIG. 1, there is no need for back reverse 26, and next forward 28—these controls are provided by multi click of existing controls. Similarly, on/off switch 16 is not provided as this control can be realised using a long press of the up and down controls. A micro USB port 30 is provided to charge and/or sync the device, as well as an LED display 32, an audio 3.5 mm jack 34, and a microphone 36. The 3.5 mm jack 34 can be used in some embodiments to charge the device. Advantageously, in some embodiments, a single port is provided for both microphone and LED displays. Clip 54 is provided in order to facilitate wearing the device, such as on a shirt or blouse, at a position that is convenient for use of the controls and/or microphone.

Figure 18A:
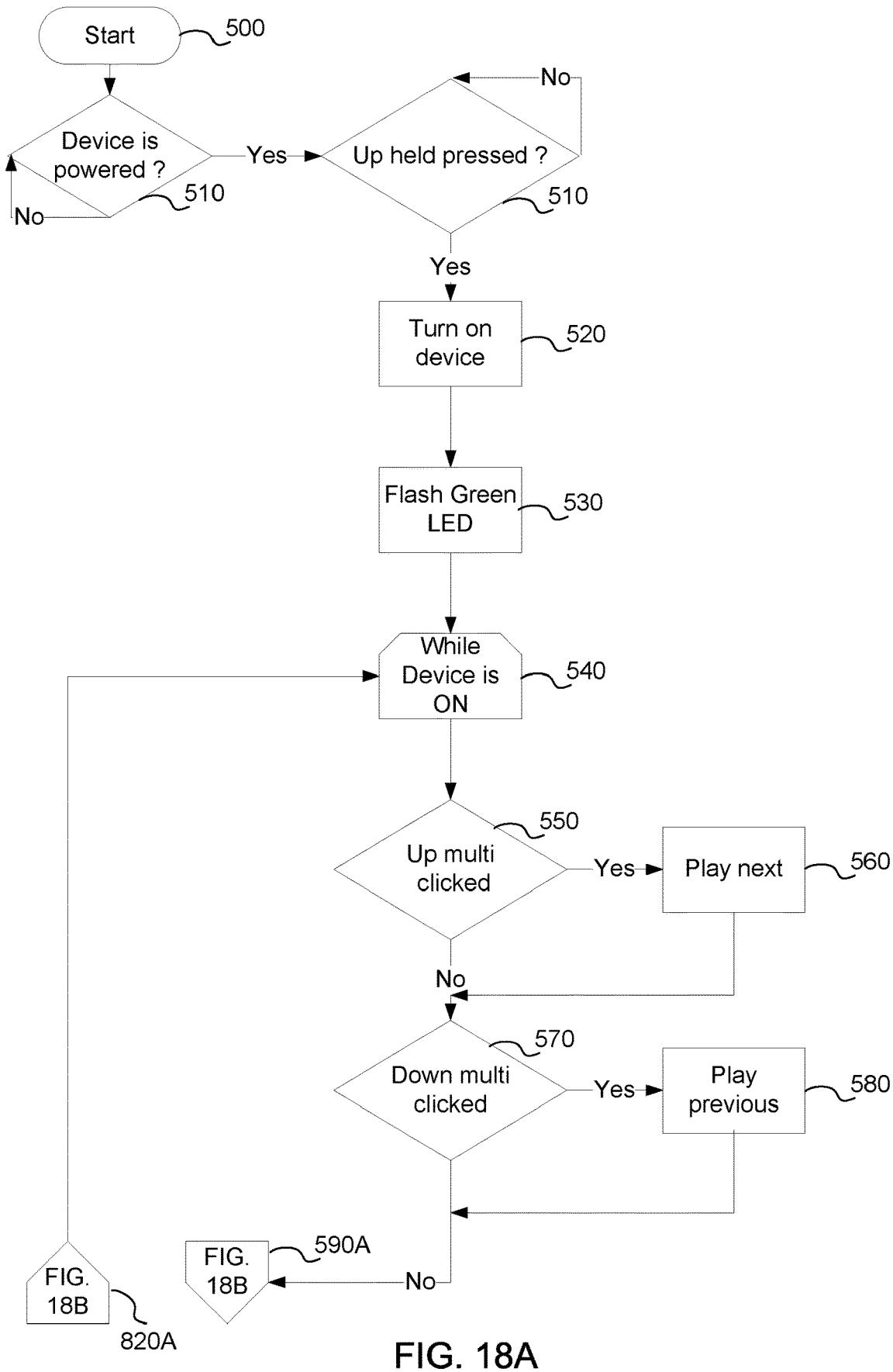
FIG. 18A is the top part of a flowchart illustrating a controller suitable to be used in some embodiments of a device provided in accordance with the present application.
Figure 18B:
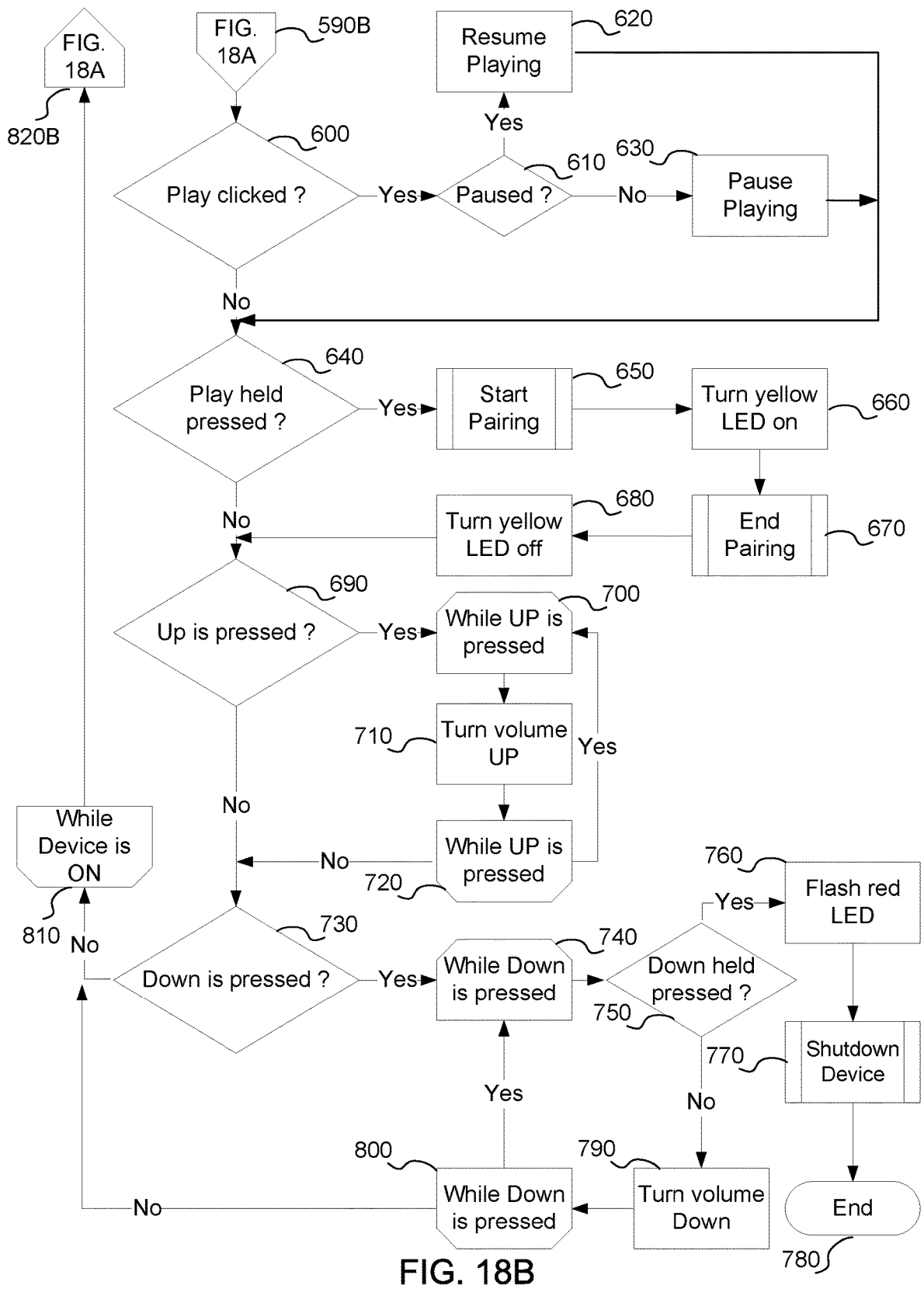
FIG. 18B is the bottom part of a flowchart illustrating a controller suitable to be used in some embodiments of a device provided in accordance with the present application.

FIGS. 18A and 18B are a flowchart illustrating a controller suitable to be used in some embodiments of a device provided in accordance with the present application. At step 500, the flowchart starts. At step 510, if the device is powered, step 520 ensues. At step 520, if the Up input, such as up 22, is held pressed. If so determined, steps 520, 530 and the steps between blocks 540 and 810 ensue. At step 520, the device is turned on. At step 530, the Green LED is flashed, for example, twice quickly, to alert the user that the device has been turned on. At block 540, a loop of a series of steps ensues. The steps between blocks 540 and 810 loop while the condition in blocks 540 and 810 is true, e.g. while the Device is on. First, at step 550, it is determined if the Up input, such as up (+) 22, is multi clicked, e.g. clicked multiple times, such as for example twice, quickly, or although not expressly shown in the drawing, if next forward 28 is clicked if that control is provided. If so determined, step 560 ensues, whereat the Play next action is triggered, such as for example playing the next audio track or song, or in the case of more than two clicks, playing the next playlist, album, or other such arrangement of audio tracks or songs. In the alternative, if it is determined that the Up input is not multi clicked at step 550, then step 570 ensues whereat it is determined it the Down input, such as down (−) 24, is multi clicked, e.g. clicked multiple times, such as for example, twice quickly, or although not expressly shown in the drawing, if back reverse 36 is clicked if that control is provided. If so determined, step 580 ensues, whereat the Play previous action is triggered, such as for example playing the previous audio track or song, or in the case of more than two clicks, playing the previous playlist, album, or other such arrangement of audio tracks or songs. In the alternative, if it is determined that the Down input is not multi clicked at step 570, then step 600 ensues (follow off page connector 590A on FIG. 18A to off page connector 590B on FIG. 18B). At step 600, it is determined if the Play input, such as play/pause/resume 21, is clicked. If so determined, then at step 610 it is determined whether playback is paused, in which case step 620 ensues, or playback is not paused, in which step 630 ensues. At step 620, playback is resumed and step 640 ensues, whereas at step 630, playback is paused and step 640 ensues. At step 640, it is determined if the Play input, such as play/pause/resume 21, is held pressed, e.g. for a predetermined amount of time, such as for example six seconds. If so determined, steps 650, 660, 670, 680 and 690 ensue. In the alternative, step 690 ensues. At step 650, the predefined pairing process starts, e.g. Bluetooth pairing. At step 660, an indication is given to the user that the device is in pairing mode, e.g. a yellow LED is turned on. At step 670, the predefined pairing process ends, e.g. Bluetooth pairing. At step 680, an indication is given to the user that the device is no longer in pairing mode, e.g. the yellow LED is turned off. At step 690, it is determined if the Up input, such as up (+) 22, is pressed. If so determined, the steps in between blocks 700 and 720 ensue while the condition in blocks 700 and 720 remains true, e.g. while the Up input is pressed. In the alternative, step 730 ensues. The step 710 loops while the condition in blocks 700 and 720 is true, e.g. while the Up input, such as up (+) 22, remains pressed. At step 710, the playback volume is increased. At block 720 if it is determined that the Up input is no longer pressed, then step 730 ensues. At step 730, it is determined if the Down input, such as down (−) 24, is pressed. If so determined, the steps in between blocks 740 and 800 ensue while the condition in blocks 740 and 800 remains true, e.g. while the Down input is pressed. In the alternative, block 810 ensues. The steps 750 to 790 loop while the condition in blocks 740 and 800 is true, e.g. while the Down input, such as down (−) 24, remains pressed. At block 750 if it is determined that the Down input is held pressed, e.g. for a predetermined amount of time, such as for example three seconds, then step 760, 770, and 780 ensue. At step 760, an indication is given to the user that the device is going to shutdown, e.g. the red LED is flashed twice. At step 770 the predefined process of shutting down the device ensues, and the flowchart ends at step 780. Conversely, if it was determined that the Down input was not held pressed at step 750, then step 790 ensues, whereat the playback volume is decreased, and blocks 810 and 540 ensues (follow off page connector 820B on FIG. 18B to off page connector 820A on FIG. 18A) and the loop while the device remains on continues.

As used in the present application the following acronyms are understood to mean:

AAC: Advanced Audio Coding
ADC: Analog-to-Digital Converter
AMP: Amplifier
DAC: Digital-to-Analog Converter
DSP: Digital Signal Processing
FLAC: Free Lossless Audio Codec
GIPO: General Purpose Input/Output
LED: Light-Emitting Diode
MIC: Microphone
MIDI: Musical Instrument Digital Interface
MUX: Multiplexer
RAM: Random Access Memory
ROM: Read-Only Memory
RX: Receiver
TV: Television
TX: Transmitter
UART: Universal Asynchronous Receiver/Transmitter
USB: Universal Serial Bus
WAV: Waveform Audio File Format
WHQFL: Wireless High Quality Free Lossless Audio
WMA: Windows Media Audio The above-described embodiments of the present invention are intended to be examples only. Those of skill in the art may effect alterations, modifications and variations to the particular embodiments without departing from the scope of the invention, which is set forth in the claims.

What is claimed is:

1. An audio transmitter and receiver device comprising:
   an audio physical interface providing an audio signal, the audio signal including at least one of an audio input signal, an audio output signal, and an audio control signal;
   a user interface including a TX/RX switch and an audio command control for controlling an aspect of the operation of the audio transmitter and receiver device;
   a controller enabling a user to manipulate the user interface to operate the device in at least one of two states by operating the user interface, the states including:

a "TX" (Transmit) state when the TX/RX switch is in the TX position whereat at least one of the following occurs:
the audio input signal is transmitted wirelessly;
the audio output signal is received wirelessly; and
the audio control signal is received wirelessly;
an "RX" (Receive) state when the TX/RX switch is in the RX position whereat at least one of the following occurs:
the audio input signal is received wirelessly;
the audio output signal is transmitted wirelessly; and
the audio control signal is transmitted wirelessly;
a digital communications interface for at least communicating one of audio information and audio control information; and
an audio codec for transcoding the audio information such that the audio information includes at least a substantially high quality distortion free lossless representation of the audio signal and the audio signal substantially includes an audio representation of the audio information and the audio control information includes at least a representation of the audio control signal;
wherein the device is paired with one other device, the other device operating in the TX state, the states of the controller further including:
an "SYN" (Synchrone) state when the user interface is operated to select Synchrone functionality whereat the following occurs:
the audio control signal, obtained from the audio command control user interface on the device is transmitted wirelessly to the TX device;
the audio output signal is transmitted wirelessly to the TX device; and
the audio input signal is transmitted from the TX device to the SYN device.

* * * * *